Feb. 23, 1937. A. KORSMO ET AL 2,071,844
WINDROW HARVESTER
Filed Sept. 12, 1936   3 Sheets-Sheet 2
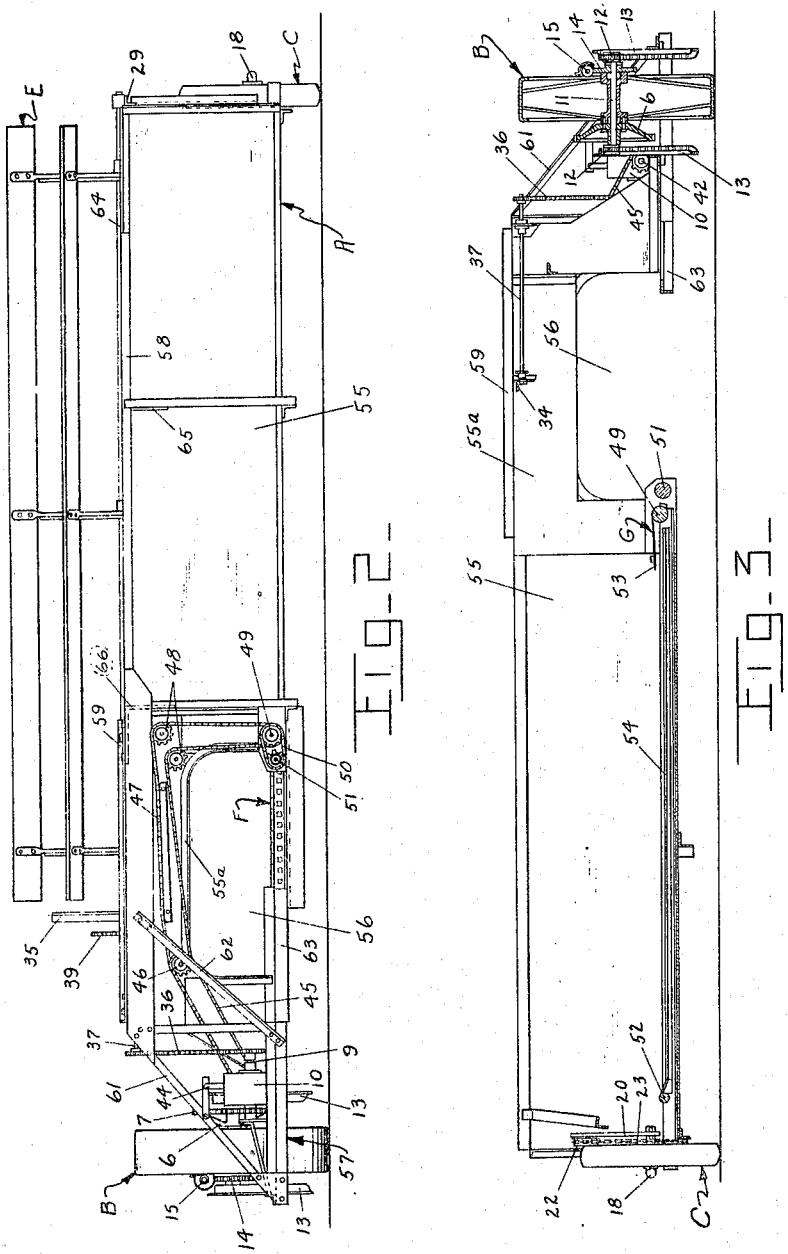

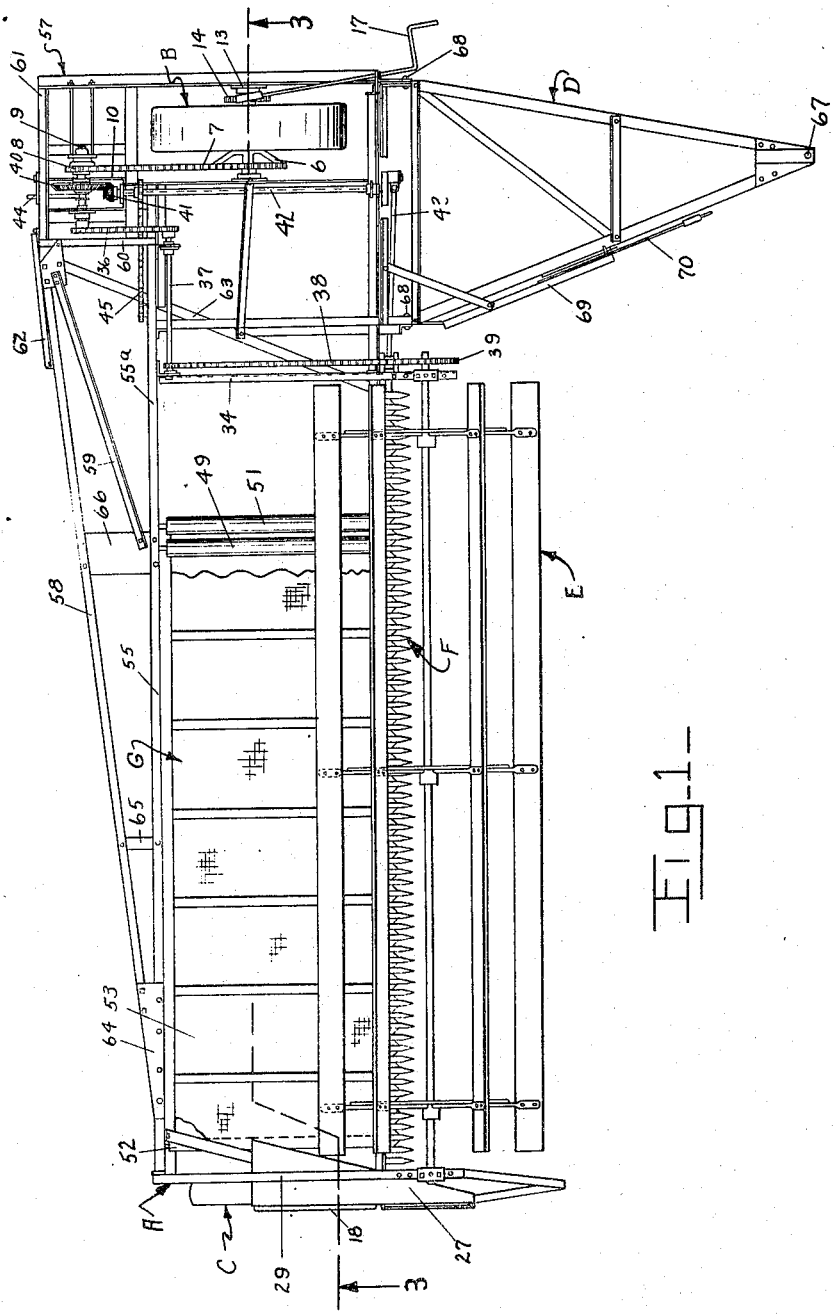

Feb. 23, 1937.   A. KORSMO ET AL   2,071,844
WINDROW HARVESTER
Filed Sept. 12, 1936   3 Sheets-Sheet 3

INVENTORS
ALFRED KORSMO
MARTIN RONNING
BY
ATTORNEY.

Patented Feb. 23, 1937

2,071,844

UNITED STATES PATENT OFFICE 2,071,844

WINDROW HARVESTER

Alfred Korsmo, Hopkins, and Martin Ronning, St. Louis Park, Minn., assignors to Minneapolis-Moline Power Implement Company, Minneapolis, Minn., a corporation of Delaware Application September 12, 1936, Serial No. 100,482

7 Claims. (Cl. 56—23)

This invention relates to crop harvesting machinery of the type generally designated as windrowers which cut the grain or other crop and leave it in windrows on the field for drying or further ripening, and preliminary to further gathering or treatment by a combine thresher; and the primary object is to provide such a machine with a novel, efficient and practical design of frame structure which will result not only in a better balance unit, but will particularly reinforce and effectively brace the crop receiving conveyor and adjacent parts when subjected to strains incident to operation. A further object is to provide the machine with lateral supporting wheels which are so placed with respect to other parts of the machine as to most effectively balance the entire structure and thus facilitate adjustments and produce easier operation. A further object is to associate with the main frame a draft frame and adjustments that will permit easy steering and tilting adjustment from the tractor or draft vehicle that will be attached to pull the machine over the field. These and still other and more specific objects will be disclosed in the course of the following specification, reference being had to the accompanying drawings, wherein:

Fig. 1 is a plan view of the machine with parts removed or broken away for purpose of illustration.

Fig. 2 is a rear elevation of the machine.

Fig. 3 is a sectional elevation as seen substantially on the line 3—3 in Fig. 1.

Figure 4:
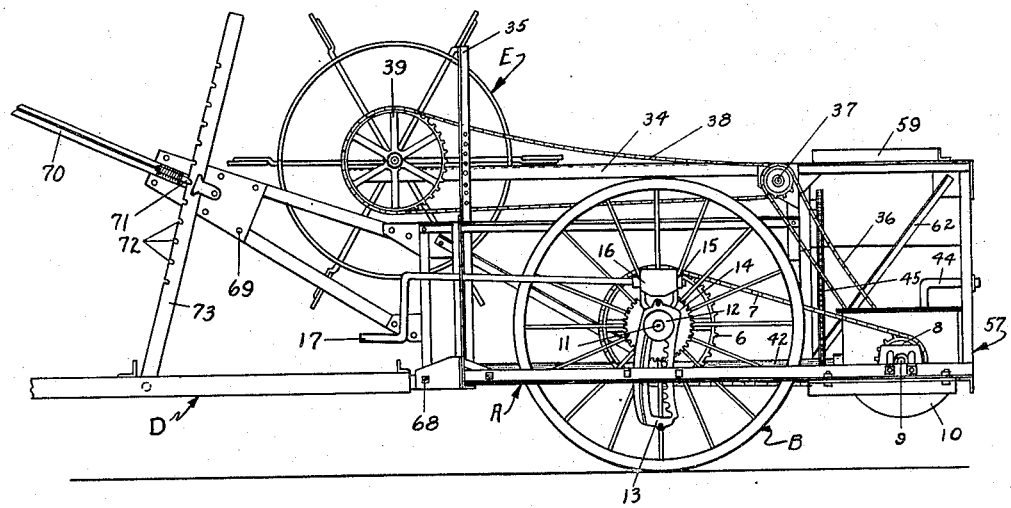
Fig. 4 is a left side elevation of the machine, or as seen from the right in Fig. 1.

Referring to the drawings more particularly and by reference characters, A designates generally the main frame of the machine, which carries the operating mechanism, while in turn being mounted on a bull wheel B at one side and a lateral idler wheel C at the other side. The main frame is transversely elongated, and at one side attaches to a draft frame D with respect to which it is tiltably adjustable, as will presently be described, such tilting action being on the transverse axis of wheels B and C.

The bull wheel B has a sprocket gear 6 which operates through a chain 7 to drive a sprocket pinion 8 on a shaft 9 which is journaled in a gear box 10 and serves to transmit power to the various operating mechanisms. The bull wheel is mounted for relative vertical adjustment so that the left side of the frame A may be raised and lowered, and this is effected as follows: The hub of the wheel is mounted on an axle 11 which is provided at opposite ends with spur pinions 12 which guide in toothed racks 13 and will move up and down therein when the axle is turned. To produce the turning adjustment and lock the pinions 12 in adjusted positions we provide the axle 11 with a worm gear 14 which meshes with a worm 15 secured in a yoke 16 and operated by a hand crank 17. It will be noted that the guide racks 13 are generally arcuate and with a center concentric with shaft 9 so that the wheel B may be adjusted without disturbing the operation or changing the effective length of drive chain 7.

The right, or platform side of the machine is also designed for vertical adjustment, in this instance with respect to wheel C, which wheel is mounted for rotation on an angular extension of a link bar 18, the forward end of which is pivoted to the main frame, as at 19, for movement in a vertical plane longitudinally with respect to the direction of travel. The inner end of the link bar extension has a standard 20, braced by bar 21, for supporting a pulley 22. A chain 23, anchored at 24 to the main frame, passes over the pulley 22 and under a pulley 25 and is releasably secured to the frame A, as at 26, so that by adjusting the chain at this point 26 the right hand end of the frame may be raised or lowered with respect to the wheel C and the ground. A sheet metal shield 27 serves to deflect the incoming grain and prevent it from becoming entangled with this mechanism.

The main frame structure at the right hand end of the machine (Fig. 5) includes a diagonal angle bar 28, for bracing the front corner with respect to rear frame parts; and the right hand end of the harvester reel, E, is supported on a rail 29, the rear end of which is pivotally secured to the main frame, as at 30. The rail 29 is horizontally supported by a brace 31 and adjustments are effected by selectively securing the attaching bolts in series of holes 32. A metal guard strap 33 forms a connecting loop between the front end of rail 29 and a part of the main frame therebelow, and is sufficiently flexible to yield in response to the vertical reel adjustments referred to. The left end of the reel E is carried by a rail 34, the rear end of which is pivotally attached to the main frame while the forward end is adjustably secured to a vertical standard 35. Thus both ends of the reel may be equally adjusted, vertically; and, of course, both ends may also be adjusted lengthwise of the rails to change the fore and aft position of the reel with respect to the cutter bar below. The reel is driven by the gear box shaft through chain 36, idler shaft 37, and chain 38 passing over reel gear 39, and any suitable clutching mechanism may of course be employed.

The sickle or cutter bar F extends in the usual manner under the reel E, and is operated from the gear box shaft 9 through bevel gear 40, bevel pinion 41, shaft 42, and pitman 43, and a suitable shipper lever 44 may be employed to engage and disengage the gears 40—41. The shaft 42 also transmits power to the platform conveyor, G, by means of a sprocket chain 45 which operates through idlers 46 (Fig. 2) to drive a second chain 47 passing over pinions 48 to supply power to the conveyor roller 49. A third chain 50, driven by roller 49, drives an adjacent roller 51, and at somewhat higher speed, to insure proper delivery of the crop material over the end of the conveyor.

The conveyor G, in addition to the rollers 49 and 51, includes an outer roller 52 over which and over the roller 49 is stretched an endless slotted apron 53. The upper or crop conveying run of the apron travels over and may rest upon a suitable plate member 54 (Fig. 3). The conveyor of course receives the crop as it is cut by the sickle F, under the feed action of reel E, and the crop is carried leftward, (toward wheel B) until it is discharged over the roller 51 and deposited on the stubble. To prevent any portion of the crop from passing rearwardly over the conveyor, we provide the main frame with a vertical back wall 55, which extends the entire length of the conveyor and in fact inwardly beyond it in the form of an arched extension 55a, defining an opening 56 through which the forming windrow may pass. It will further be noted that the cutter bar F also projects inwardly beyond the conveyor G with a result that crop cut by the inner sickles will merely pass thereover and drop into the windrow material being discharged from the conveyor.

Figure 5:
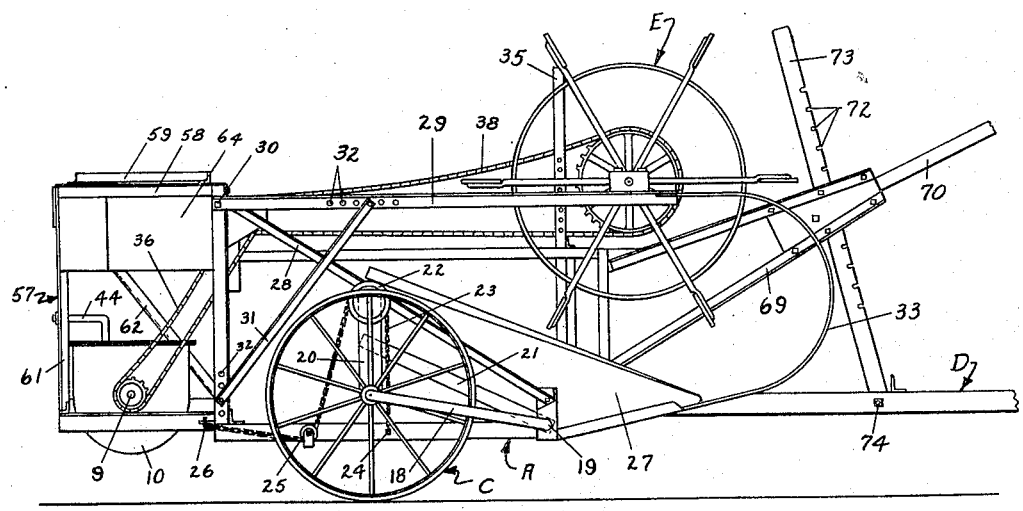
Fig. 5 is a right side elevation of the machine, or as seen from the left in Fig. 1.

It will be noted, with particular reference to Figs. 1, 4, and 5, that at the left side of the machine the frame A is extended rearwardly, as at 57, so as to support the gear box 10 at a point rearwardly of the plane of the back wall 55, and that such frame extension constitutes part of a general truss unit including a series of inclined and diagonal truss bars 58, 59, 60, 61, 62, and 63, and the bar 58 is secured at an acute angle and at spaced intervals to the back wall structure 55 of the main frame, as by rigid connector devices 64, 65, and 66, the last of which also anchors the outer end of brace bar 59.

The arrangement just described is, in the practical construction and actual operation of the machine, directly correlated and intimately associated with other mechanisms and parts to secure certain advantages and results. Thus the frame extension 57 and truss members 58—66 are arranged rearwardly in an out of the way position while giving all necessary supporting rigidity to the platform or conveyor and reel supporting end of the frame. This is a most important consideration in machines of this character which are expected to cut wide swaths and therefore require very long cutting and conveying devices which must often operate under heavy crop conditions.

Another and also very vital circumstance is the fact that the design described results in a proper distribution of weight and location of the center of gravity to provide for all necessary adjustments with a minimum amount of control equipment and with as little manual effort as possible. Thus the truss, frame extension, and gear box parts, being located rearwardly serve to counterbalance the weight of the forepart, including reel E, while the axis of tilting adjustment is maintained at the supporting centers of wheels B and C; and with the wheel centers disposed substantially midway between the fore and aft limits of the conveyor G the tilting adjustments referred to may be utilized to vertically adjust the operating position of the cutter bar F, which is spaced sufficiently forward of the tilting axis to permit utilization of this movement. It will of course be obvious that this arrangement and advantage is not possible in a machine the weight distribution of which requires the supporting wheel to be disposed in line with (or forward of) the cutter bar, in which event the tilting action will merely tilt but not raise or lower the sickle. It will be equally obvious that the supporting wheel arrangement is far superior to the complicated machine types in which the bull wheels and supporting trucks are arranged rearwardly of the machine.

The draft frame D is of generally triangular truss construction with its front apex end 67 adapted for attachment to a tractor draw bar, while it is pivotally secured at transversely spaced points 68 to the main frame A for properly guiding the latter over the field. The main frame has a forwardly extending, relatively rigid, adjuster frame 69, with an extension lever 70, with a manually releasable latch 71 for selectively engaging notches 72 in a bar 73 which is slidably associated with the frame 69 while its lower end is pivotally secured to frame D, as at 74. The lever handle is disposed within reach of the tractor operator and can consequently be manipulated, if desired, to effect the tilting adjustments when the machine is in motion.

Having thus fully described our invention, what we claim as new, and desire to secure by Letters Patent, is:

1. A windrow harvester comprising a main frame having a bottom opening for the passage of crop into a windrow and tiltably supported at one side on a bull wheel and at the other side on a second wheel, a draft member extending forwardly from the main frame, means associated with the draft member for tiltably adjusting the main frame on said wheels, a transversely extending cutter bar and reel carried by the front part of the main frame, a conveyor carried by the main frame rearwardly of the cutter bar and for discharging the cut crop laterally through said frame opening and onto the ground, and a series of truss members disposed rearwardly of the main frame proper and attached thereto to reinforce the same lengthwise in its transverse direction and to assist in counterbalancing the portion of the machine disposed in advance of the tilting axis, said tilting axis being in a vertical transverse plane extending approximately midway between the front and rear edges of the conveyor.

2. A windrow harvester comprising a generally transversely elongated frame having an opening for the passage of crop material into a windrow as the harvester travels over a field, a cutting mechanism carried by the front part of the frame, a conveyor for receiving cut crop material from the cutting mechanism and for conveying it transversely therebehind for discharge through said frame opening, a series of truss forming brace members disposed rearwardly of the frame proper and attached at spaced points thereto to reinforce the frame throughout its transverse length and to assist in counterbalancing the fore part of the machine, a pair of wheels respectively supporting opposite side ends of the frame and for tilting action on an axis disposed in a transverse vertical plane passing through the conveyor approximately midway between its front and rear extremities, a draft member, and means, connected with the draft member to tiltably adjust the frame and thereby raise and lower the cutting mechanism with respect to the ground.

3. A windrow harvester comprising a main frame having a bottom opening for the passage of crop into a windrow and tiltably supported at one side on a bull wheel and at the other side on a second wheel, a draft member extending forwardly from the main frame, means associated with the draft member for tiltably adjusting the main frame on said wheels, a transversely extending cutter bar and reel carried by the front part of the main frame, a conveyor carried by the main frame rearwardly of the cutter bar and for discharging the cut crop laterally through said frame opening and onto the ground, a wall carried by the frame rearwardly of the conveyor and extending throughout the length of and beyond one end of the conveyor, and a series of truss members disposed rearwardly of the wall and attached to the main frame proper to reinforce the same lengthwise in its transverse direction and to assist in counterbalancing the portion of the machine disposed in advance of the tilting axis thereof.

4. A windrow harvester comprising a main frame having a bottom opening for the passage of crop into a windrow and tiltably supported at one side on a bull wheel and at the other side on a second wheel, a draft member extending forwardly from the main frame, means associated with the draft member for tiltably adjusting the main frame on said wheels, a transversely extending cutter bar and reel carried by the front part of the main frame, a conveyor carried by the main frame rearwardly of the cutter bar and for discharging the cut crop laterally through said frame opening and onto the ground, a wall carried by the frame rearwardly of the conveyor and extending throughout the length of and beyond one end of the conveyor, and a series of truss members disposed rearwardly of the wall and attached to the main frame proper to reinforce the same lengthwise in its transverse direction and to assist in counterbalancing the portion of the machine disposed in advance of the tilting axis, said tilting axis being in a vertical transverse plane extending approximately midway between the front and rear edges of the conveyor, and said wall portion which extends transversely beyond the conveyor being provided with an arched opening, rearwardly of the aforementioned bottom frame opening, for clearing the top of the windrow as the machine moves forwardly.

5. A windrow harvester comprising a generally transversely elongated frame having an opening for the passage of crop material into a windrow as the harvester travels over a field, a cutting mechanism carried by the front part of the frame, a conveyor for receiving cut crop material from the cutting mechanism and for conveying it transversely therebehind for discharge through said frame opening, a substantially vertical, transverse wall carried by the frame rearwardly of the conveyor, said frame being provided at one end with an extension projecting rearwardly with respect to the plane of the wall, and having oblique truss bars extending forwardly and laterally to reinforce the wall and the frame portion supporting the conveyor, a pair of supporting wheels disposed one at each side end of the frame and for tiltably supporting the harvester on an axis extending substantially through its fore and aft center of gravity, and a draft frame adjustably attached to the frame and extending forwardly therefrom.

6. A windrow harvester comprising a generally transversely elongated frame having an opening for the passage of crop material into a windrow as the harvester travels over a field, a cutting mechanism carried by the front part of the frame, a conveyor for receiving cut crop material from the cutting mechanism and for conveying it transversely therebehind for discharge through said frame opening, a substantially vertical, transverse wall carried by the frame rearwardly of the conveyor, said frame being provided at one end with an extension projecting rearwardly with respect to the plane of the wall, and having oblique truss bars extending forwardly and laterally to reinforce the wall and the frame portion supporting the conveyor, a pair of supporting wheels disposed one at each side end of the frame and for tiltably supporting the harvester on an axis extending substantially through its fore and aft center of gravity, a substantially triangular draft frame extending forwardly from one side of the main frame for attachment to a tractor and being pivotally attached at transversely spaced points to the main frame, an adjuster lever extending forwardly from the main frame and to within reach of the tractor operator for tilting the main frame, and means for releasably securing the adjuster lever with respect to the draft frame.

7. A windrow harvester comprising a generally transversely elongated frame having an opening for the passage of crop material into a windrow as the harvester travels over a field, a cutting mechanism carried by the front part of the frame, a conveyor for receiving cut crop material from the cutting mechanism and for conveying it transversely therebehind for discharge through said frame opening, a substantially vertical, transverse wall carried by the frame rearwardly of the conveyor, said frame being provided at one end with an extension projecting rearwardly with respect to the plane of the wall, and having oblique truss bars extending forwardly and laterally to reinforce the wall and the frame portion supporting the conveyor, a pair of supporting wheels disposed one at each side end of the frame and for tiltably supporting the harvester on an axis extending substantially through its fore and aft center of gravity, a power transmission unit carried by the frame extension, rearwardly of the plane of said wall, and connected with one of said wheels to receive power therefrom, means for transmitting power from said unit to the cutting mechanism and conveyor, and means for adjusting the main frame on said tilting axis to vertically adjust the operative position of the cutting mechanism.

ALFRED KORSMO.
MARTIN RONNING.